Jan. 10, 1967　　　H. GRONAU　　　3,296,879
GEAR CHANGING MECHANISM

Filed Feb. 12, 1964　　　6 Sheets-Sheet 2

INVENTOR
HANS GRONAU
BY
ATTORNEYS

Jan. 10, 1967     H. GRONAU     3,296,879
GEAR CHANGING MECHANISM
Filed Feb. 12, 1964     6 Sheets-Sheet 3
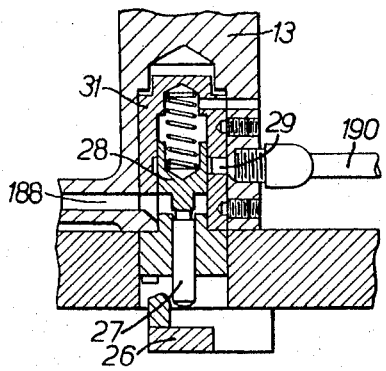
FIG. 4.
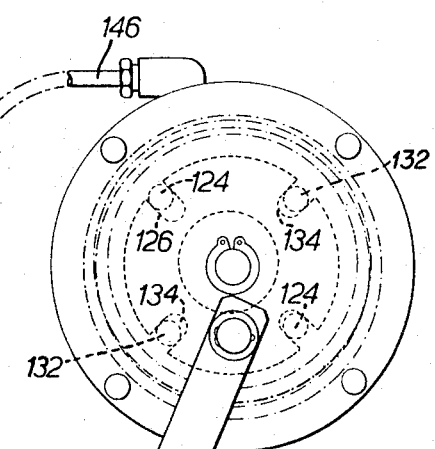
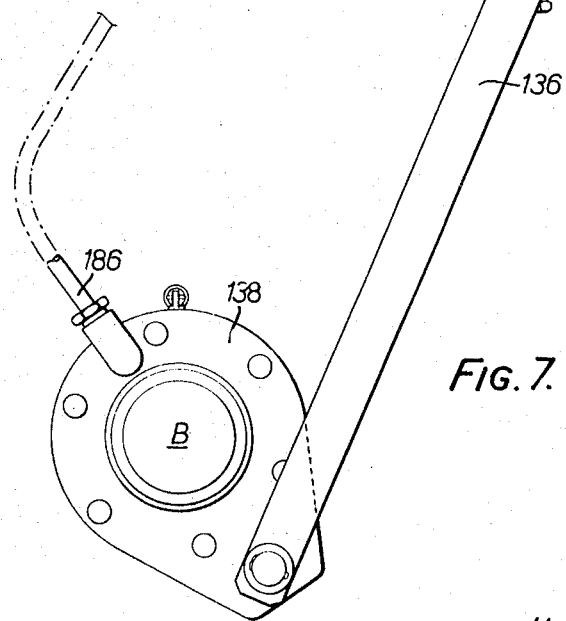
FIG. 7.
INVENTOR
HANS GRONAU
BY Hane and Nydick
ATTORNEYS Jan. 10, 1967        H. GRONAU        3,296,879

GEAR CHANGING MECHANISM

Filed Feb. 12, 1964        6 Sheets-Sheet 5

INVENTOR
HANS GRONAU

BY Hane and Nydick

ATTORNE

United States Patent Office 3,296,879
Patented Jan. 10, 1967

3,296,879
GEAR CHANGING MECHANISM
Hans Gronau, London, England, assignor to
B. Elliott (Machinery) Limited
Filed Feb. 12, 1964, Ser. No. 344,314
Claims priority, application Great Britain, Feb. 15, 1963,
6,222/63
11 Claims. (Cl. 74—339)

This invention relates to gearing provided with means for effecting partial rotation of the gears in order to facilitate gear changing.

The invention includes gearing comprising a plurality of shafts, a plurality of gears on the shafts, some of said gears being shiftable to alter the transmission ratio, a motor, a reduction gear mechanism driven by the motor for producing a slow speed oscillating rotary motion, a normally disengaged clutch for coupling the mechanism to one of said shafts and applying said motion thereto, the motor being unconnected with said shafts except through said mechanism and clutch, and means responsive to operation of the motor to effect engagement of the clutch.

Preferably, the above mentioned is hydraulically actuated and the motor drives an hydraulic pump which supplies pressure fluid to the clutch. In the particular form of the invention described herein, the same pump supplies fluid for actuating hydraulically operated gear shifters for moving the gears, and also to a locking device which, until actuated, locks the gears against axial movement.

One particular form of gearing in accordance with the present invention is described below, by way of example, with reference to the accompanying drawings, in which:

FIGURE 4 is a section of part of a locking mechanism;

FIGURE 7 is an end view taken from the left of FIGURES 5 and 6;

Figure 1:
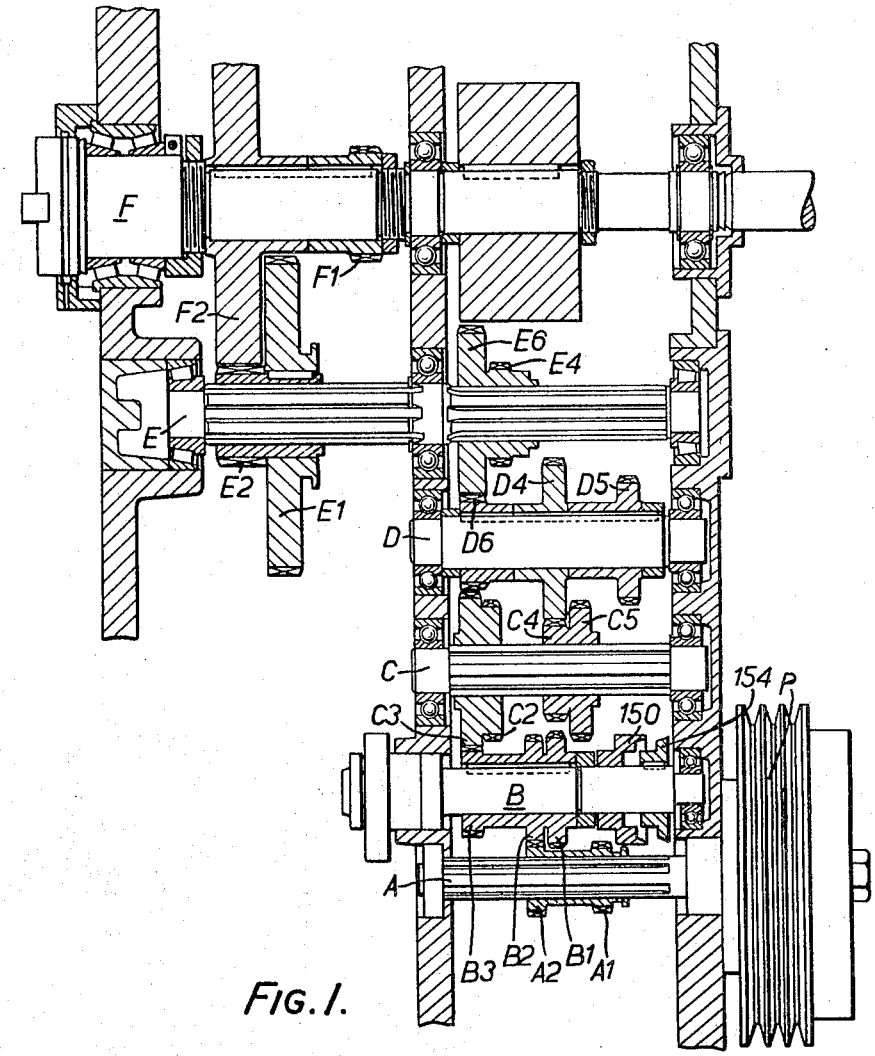
FIGURE 1 is a somewhat diagrammatic, part sectional elevation of a gearbox.

The gearbox shown in FIGURE 1 includes an input shaft A carrying a pulley P driven by belts from an electric motor (not shown). The input shaft A is coupled to the output shaft F (which may for example constitute the spindle of a milling machine) by gears on intermediate gear shafts B, C, D and E. The gears carried on shafts B, D and F are keyed and secured against axial movement along those shafts, while the gears carried on shafts A, C and E are slidably keyed to the shafts, being shiftable into and out of engagement with respective fixed gears on the adjacent shafts to alter the transmission ratio. The shiftable gears are all double gears, each having two, and two only, operative positions. For example, the double gear A1, A2 has an extreme righthand position in which gear A2 meshes with the adjacent fixed gear B2 (as shown), an extreme lefthand position in which gear A1 meshes with gear B1. Gears on adjacent shafts and which can mesh with each other have been given like reference numerals in the drawings. For example gear D5 on shaft D can mesh with gear C5 on shaft C.

Figure 2:
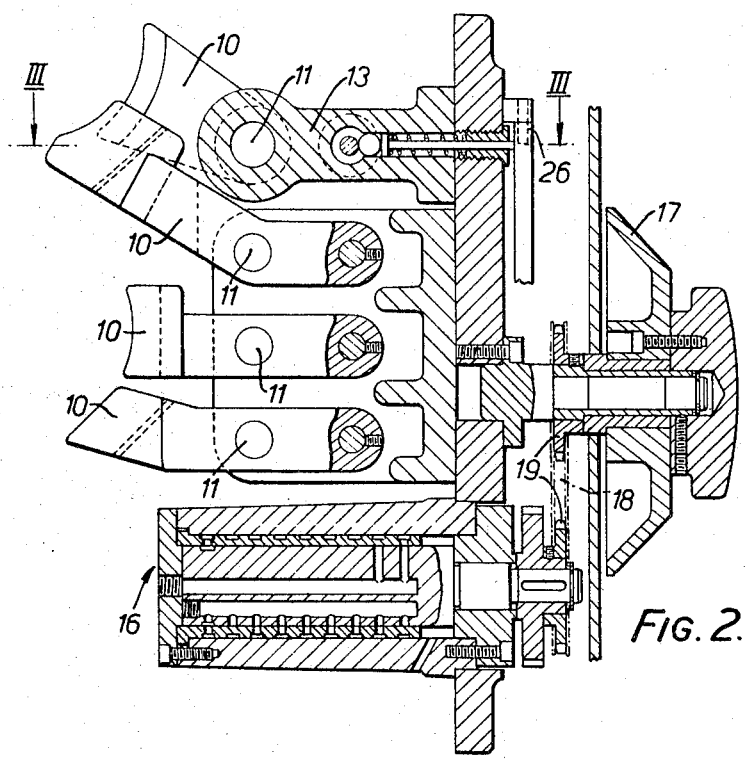
FIGURE 2 is a sectional elevation of part of the gear shifting mechanism.
Figure 3:
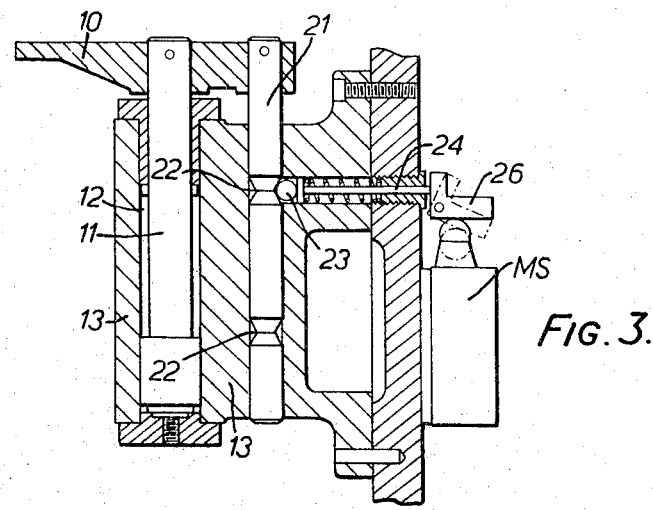
FIGURE 3 is a sectional plan taken on the line III—III of FIGURE 2.
Figure 5:
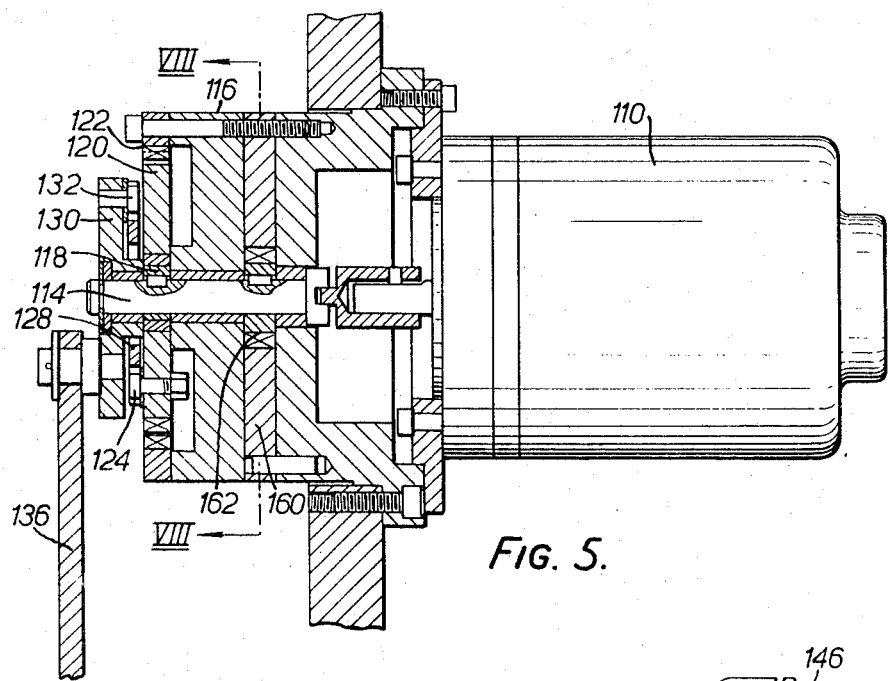
FIGURE 5 is a part sectional elevation of part of a creep speed mechanism.
Figure 6:
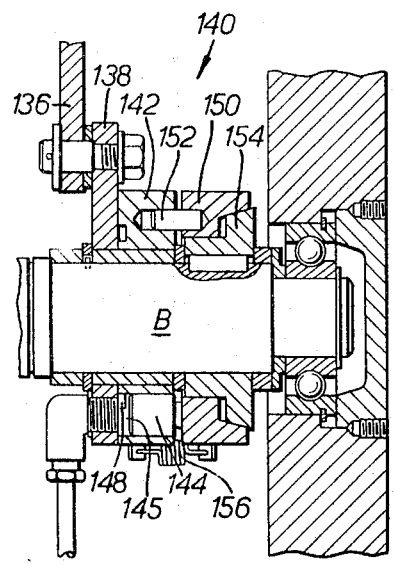
FIGURE 6 is a view similar to FIGURE 5 of another part of the same mechanism.
Figure 8:
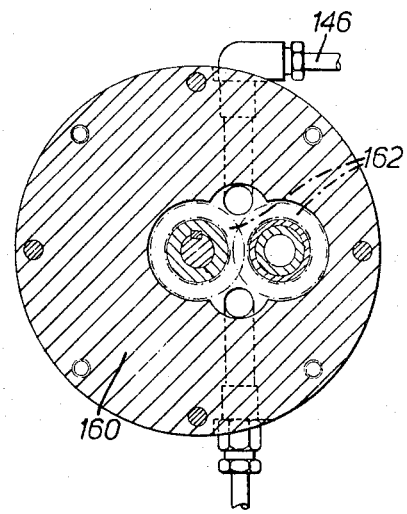
FIGURE 8 is a section on the line VIII—VIII of FIGURE 5.

The double gear on shaft A is manually shiftable to give a choice of two speed ranges, but the four remaining double gears are shifted by an hydraulically operated gear changing mechanism, illustrated in FIGURES 2 and 3. Four gear forks 10 are provided (each engaging one of the double gears), these forks being fast with respective double acting plungers 11, each working in a cylinder 12 formed in a block 13. For moving each plunger to either of its extreme positions, the respective ends of each cylinder are connected to a pre-selector device comprising a rotary valve 16. This valve has sixteen angularly spaced operative positions, each of which corresponds to a particular combination of positions of the double gears, and in each angular position the valve establishes a connection between one end of each cylinder and a potential source of hydraulic fluid under pressure, and between the opposite end of the cylinder and exhaust. The rotary valve is operated by means of a hand wheel 17 to which it is coupled by a chain 18 and sprockets 19. A gear change is effected by rotating the hand wheel, and thus the rotary valve, to select the required speed, and by pumping hydraulic fluid under pressure through a supply connection to the rotary valve which distributes the fluid to the appropriate ends of the gear shift cylinders, so that any plungers which are not already in an appropriate position are shifted.

In order to prevent movement of the gears during normal operation, i.e. between gear changes, there is provided a locking mechanism shown in FIGURES 2, 3 and 4. Fast with each of the gear forks 10 and parallel with the plungers 11 there is a locking rod 21 formed with two, spaced, V-shaped grooves 22, one or other of which is positioned to receive a locking ball 23 when the gear shift fork is in either of its extreme positions. The ball is normally held in locking engagement with the rod by a locking plunger 24 which in turn is restrained against outward movement by a pivoted latch member 26 common to the four locking plungers. A spring (not shown) urges the latch towards its latching position, as shown in FIGURES 3 and 4, and a bolt 27 positively secures the latch against movement away from this position. The bolt 27 is integral or fast with a valve piston 28 which is spring urged to a position in which it covers an outlet port 29 formed in a valve body 31, and in which the bolt 27 restrains the latch member 26. The bolt can be withdrawn by supplying hydraulic fluid under pressure to a passage 188 communicating with the outer end of the valve body to displace the valve piston 28 and bolt 27 against spring action. The port 29 is connected to a conduit 190 which constitutes the only connection between the hydraulic pressure supply and the rotary selector valve 16 described above. The bolt 27 having been withdrawn the gear forks 10 can move under the pressure applied to the plungers 11. As the locking rods 21 move, the balls 23 are forced out of the grooves 22 to displace the plungers 24 outwardly, causing the latch member 26 to pivot against the action of its return spring. The latch member in turn actuates a micro-switch MS, whose function will be described. When all the gears have arrived in their predetermined position, the parts can return, under the actions of the various return springs, to their illustrated positions, and the microswitch MS is released by the latch member.

The creep speed mechanism for applying a slow speed oscillating rotary motion to shaft B to facilitate gear changes, is shown in FIGURES 5 to 8. The mechanism includes a motor 110 which drives a shaft 114 rotatably supported in bearings in a housing 116. Keyed to the shaft 114 is an eccentric 118 carrying a gear wheel 120, having 40 teeth, which meshes with an annular gear 122, having 41 teeth, which is secured to the housing 116. The gear 120 carries a pair of diametrically opposite drive pins 124 locating in radial slots 126 in an intermediate drive plate 128, which is free to move eccentrically relative to the shaft 112. A crank disc 130 journalled on the shaft 112 carries a pair of driven pins 132 locating in radial slots 134 in the drive plate 128, these slots being diametrically opposite each other and spaced 90° from the slots 126. Journalled on the crank disc 130 is one end of a crank arm 136, whose other end is journalled on a crank plate 138 rotatably mounted on the gear shaft B. The crank plate 138 is adapted to be coupled to the shaft B by means of an hydraulic clutch 140. The clutch 140 includes a body 142 fast with the crank plate 138 and housing a plurality of plungers 144 in individual chambers 145 which are connected to each other and to an hydraulic fluid supply pipe 146 by an annular passage 148. The driving member of the clutch comprises a female cone member 150 which is keyed for rotation with the body 142 by means of dowels 152, and rotatable and slidable axially on the driven male cone member 154, which is keyed to the gear shaft B. Return springs 156 are connected between the driving member 150 and the body 142. These springs normally hold the clutch disengaged and engagement is effected by supplying hydraulic fluid under pressure to the clutch plungers 144.

A pump for supplying hydraulic fluid to the clutch is incorporated in the motor unit, and comprises a body 160 in the form of a plate which is apertured to define a pump chamber in which two pump gears 162 are journalled, the driving gear being keyed to the driving shaft 114. Hydraulic pressure is automatically generated in the pump and supplied to the clutch in response to operation of the motor 110.

When a gear change is to be made the motor 110 is started to rotate the shaft 114, so actuating the pump and supplying hydraulic fluid to the clutch plungers 144. The plungers are forced outwardly to press the driving cone member 150, against the action of springs 156, into coupling engagement with the driven cone members 154, thereby effectively coupling the crank plate 138 to the gear shaft B.

Rotation of the shaft 114 also produces a planetary motion of the gear 120, which is rotated at slow speed about its own axis, by virtue of its engagement with the annular gear 122, and which moves bodily about the axis of the shaft 114, at a higher speed in synchronism with the rotation thereof by virtue of the action of the eccentric 118. The pin and slot connections between the gear 120 and the drive plate 128, and between the plate 128 and the crank disc 130 result in only the slow speed rotation of the gear 120 being transmitted to the crank disc. The crank arm converts the continuous rotation of the crank disc into slow speed, oscillating, angular movement of the crank plate 138, and, therefore of the gear shaft B. This movement of the gear shaft is continued while the gear change is being made and is stopped, by stopping the motor 110, when the gear change is completed.

The pump 160 which actuates the hydraulic clutch 140 is also arranged to supply fluid to valve piston 28 to operate the locking device, and then to the gear shifting mechanism.

Figure 9:
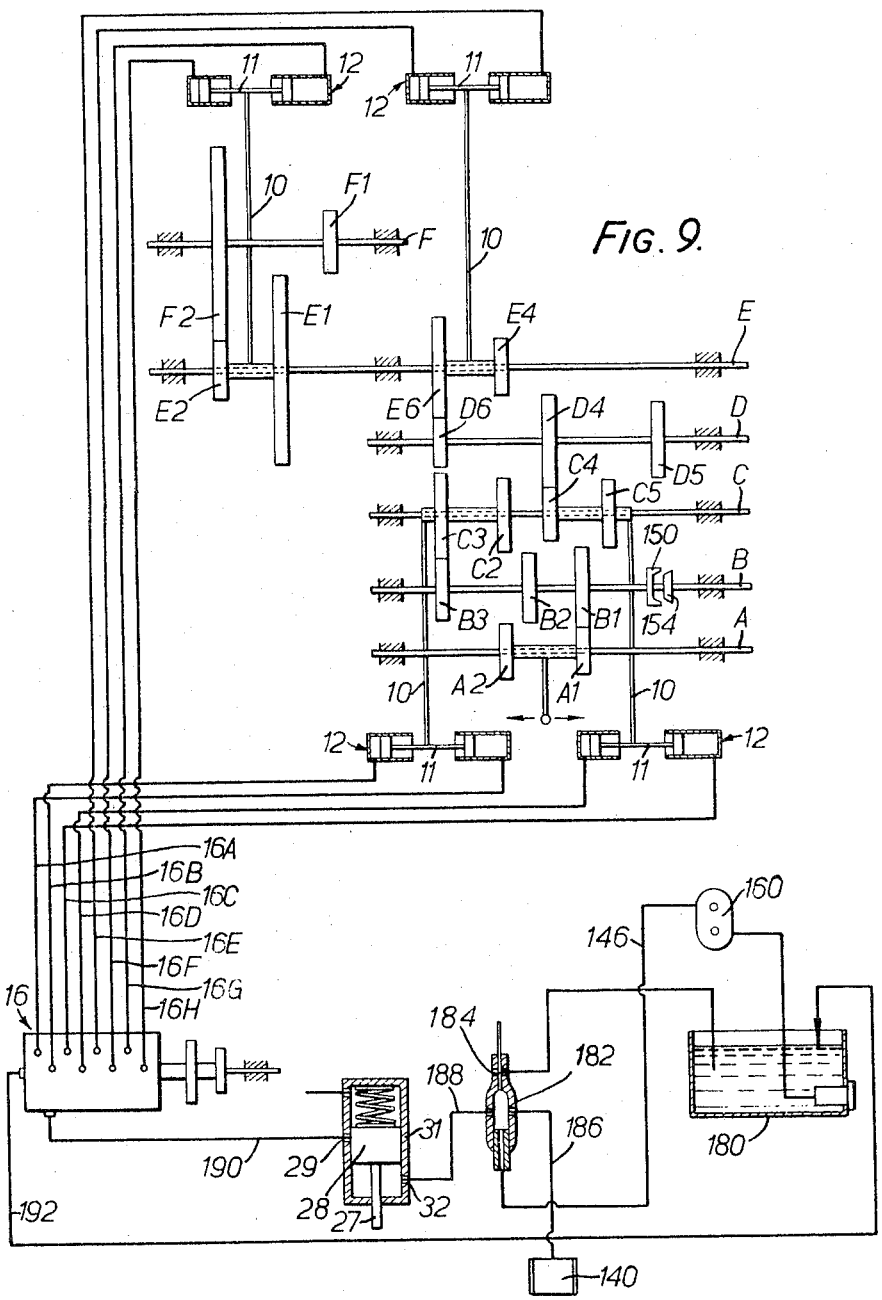
FIGURE 9 is a diagram showing the hydraulic circuit.

The general arrangement of the hydraulic circuit is shown diagrammatically in FIGURE 9. The pump 160 takes hydraulic fluid from a tank 180 and has its outlet connected to the conduit 146, which leads to a distributor 182 provided with a pressure relief valve 184 and having two outlet conduits 186 and 188 connected respectively to the clutch 140 and to the port 32 of the locking valve body 31. Port 29 is connected by a conduit 190 to the main supply port of the rotary valve 16, whose main return port is connected by a conduit 192 to the tank 180. The valve 16 has eight conduits, 16A to 16H, each connected to one end of a different one of the cylinders 12 which house the gear shifter plungers 11 secured to gear forks 10.

To summarise, the mechanical and hydraulic operation involved in a gear change are as follows. Energisation of the motor 110 sets in motion the creep speed reduction gear mechanism so as to apply an oscillating rotary motion to the driving cone clutch member 150 which is journalled on shaft B. At the same time, energisation of motor 10 also drives pump 160, which supplies fluid under pressure to conduit 146 to distributor 182, and thus to conduits 186 and 188. Fluid supplied through conduit 186 operates the clutch 140, so that the clutch member 150 is coupled to shaft B and transmits its oscillating rotary motion thereto. The fluid pressure applied through conduit 188 to valve piston 28 displaces the piston against its spring, thus withdrawing bolt 27 and thereby freeing the gear shifting mechanism. The port 29 is then uncovered so that fluid pressure is applied through conduit 190 to the rotary pre-selector valve 16, which, for the purposes of illustration will be assumed to have been adjusted to select a gear setting which requires all of the movable gears to shift to the right of the positions shown in FIGURE 9. Thus conduits 16B, 16D, 16F and 16H, communicating with the left hand ends of the cylinders 12, are connected to the supply pressure and conduits 16A, 16C, 16E and 16H, communicating with the right hand ends of the cylinders, are connected to the return line 192. The plungers 11 are therefore moved to the right to disengage the shiftable double gears from the adjacent fixed gears. As the gear C2 moves to the right, the gentle oscillation of shaft B and gear B2, will facilitate the proper engagement of gears C2 and B2, and this engagement having been completed the oscillating rotary motion is transmitted to shaft C thus facilitating engagement of gears C5 and D5, if it has not already been effected, so that shaft D is oscillated, the process continuing until all the gears C5, E4 and E1 have been properly engaged with the adjacent fixed gears.

Means (to be described) are provided for deenergising the motor 110 when a gear change is completed, so that the oscillating rotary motor ceases, and pump 160 stops with the result that: the clutch 140 is disengaged; the gear shift plungers are relieved of pressure; and the valve piston 28 and bolt 27 are returned to their original, locking position in which the bolt re-engages the latch 26.

Figure 10:
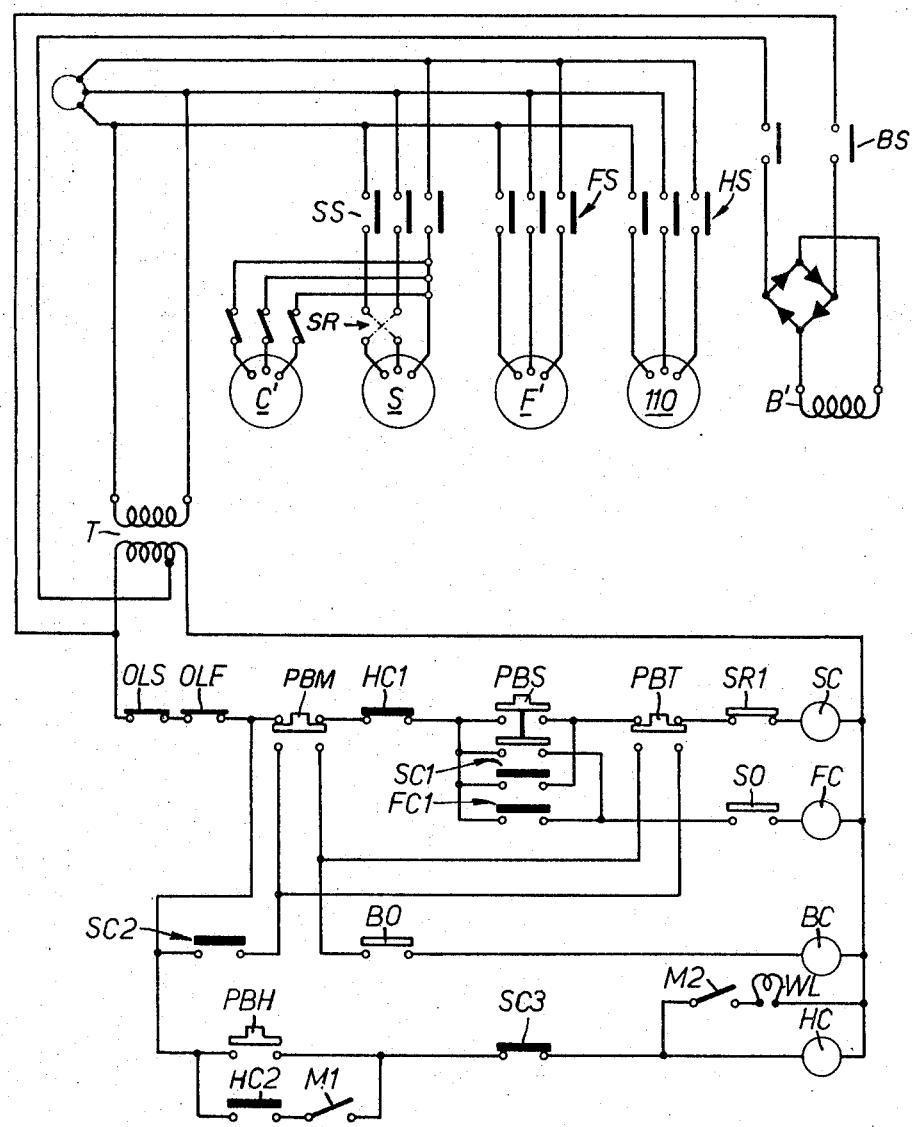
FIGURE 10 is an electrical circuit diagram.

The electrical control circuit of the machine is shown in FIGURE 10.

The electric motor 110, a coolant pump motor C', spindle motor S, feed motor F' and an electromagnetic brake B' for the spindle, are fed by a three phase supply and controlled by contactors HS, SS, FS and BS, respectively, the switches in turn being controlled by respective energising coils HC, SC, FC and BC. The spindle motor is also provided with a reversing switch SR.

The respective coils are controlled in a secondary circuit which is energised from a transformer T.

In the circuit diagram, relay switches controlled by the respective coils, are identified by the reference letters of the appropriate coil suffixed by a numeral e.g. SC1, HC2. These switches are normally in the positions indicated and are reversed when the coils are energised. Push button switches are prefixed PB.

For energising the spindle motor coil SC, there is a circuit including, in series, two overload switches OLS and OLF, associated with the spindle motor and feed motor respectively, a master stop switch PBM, relay switch HC1, one pole of a start switch PBS, a spindle stop switch PBT, a spindle reversing switch SR1 and the coil SC. The switch SR1 isolates coil SC whenever the reversing switch SR is operated.

For energising the feed motor coil FC, there is a circuit including in series, the second pole of start switch PBS, a "spindle only" switch SO and the coil FC. Relay switches SC1 and FC1 are connected in parallel across the start switch PBS.

An energising circuit for the brake coil BC comprises a relay switch SC2, which can be connected to a brake "on-off" switch BO by operation of either the master switch PBM or the spindle stop switch PBT.

An energising circuit for the pump motor coil HC comprises a gear change switch PBH, and a relay switch SC3. Connected in parallel across the switch PBH are a relay switch HC2 and one pair of contacts M1 of the microswitch MS which is shown in FIGURE 3. Connected in parallel across the coil HC are the second pair of contacts M2 of the micro-switch MS and a warning lamp WL.

It will be seen that when the coil SC is operated, relay switch SC3 is opened to prevent operation of the pump motor coil HC. Conversely operation of coil HC will open the relay switch HC1 to prevent operation of the coils SC and FC and thus of the spindle and feed motors. Operation of switches PBM and PBT will deenergise the spindle and feed motors and energise the electro-magnetic brake B'.

With the relay switch SC3 closed, operation of the switch PBH will energise coil HC which operates to close the motor contactor HS so that the motor 110 is started, the gear shaft B is oscillated, and the appropriate gear shift plungers 11 commence their movement, whereupon the locking plungers actuate the latch 26 to operate micro-switch MS, closing both sets of micro-switch contacts M1 and M2. Closure of contacts M1 completes, with relay switch HC2, a holding circuit for the coil HC, and closure of contacts M2 energises warning lamp WL. When all of the plungers reach their respective alternative extreme positions the latch 26 returns to its latching position, releasing the actuating member of micro-switch MS; the micro-switch contacts M1 and M2 open, the warning lamp goes out and the coil HC is de-energised, so de-energising the motor 110.

It should be noted that if it is desired to shift the manually movable double gear A1, A2, the creep speed mechanism for oscillating shaft B can be brought into operation by holding depressed the push button PBH while the gear change is effected.

The invention has been described above in its application to the spindle gearing of a milling machine, but those skilled in the art will appreciate that various other applications will be possible within the scope of the appended claims.

I claim:

1. Gearing comprising a plurality of shafts, a plurality of gears on the shafts for transmitting drive from a main drive means, some of said gears being shiftable to alter the transmission ratio, an auxiliary motor separate from the main drive means, a reduction gear mechanism driven by the motor for producing a slow speed oscillating rotary motion, a normally disengaged clutch for coupling the mechanism to one of said shafts and applying said motion thereto, the motor being unconnected with said shafts except through said mechanism and clutch, and means responsive to operation of the motor to effect engagement of the clutch and thereby cause said one shaft to be oscillated, irrespective of the position of said gears, whereby movement of the gears into new operative positions is facilitated.

2. Gearing in accordance with claim 1, comprising an hydraulic pump driven by said motor, and wherein said clutch is hydraulically actuated and is supplied by said pump.

3. Gearing in accordance with claim 1, comprising a pre-selector device for predetermining a subsequent operative position of one or more of said shiftable gears, means actuated by said motor for moving said shiftable gears into said predetermined position, an energizing circuit for said motor including holding means for maintaining said circuit energised, and means responsive to the arrival of all of said shiftable gears in said predetermined positions to de-activate said holding means and thereby de-energize said motor.

4. Gearing in accordance with claim 1, comprising a locking mechanism which normally acts to prevent movement of said shiftable gears, said locking mechanism being hydraulically operable to release the gears, and an hydraulic pump driven by said motor and arranged to supply hydraulic fluid under pressure to operate said locking mechanism.

5. Gearing in accordance with claim 4, comprising hydraulically actuated gear shifters for moving said shiftable gears, said gear shifters being supplied by said pump.

6. Gearing in accordance with claim 5, comprising a valve arrangement associated with said locking mechanism, said valve arrangement normally acting to isolate said gear shifters from said pump, but automatically responsive to operation of said locking mechanism to connect said shifters with said pump.

7. Gearing comprising a pair of shafts, a plurality of gears on said shafts, an hydraulically operable gear shifter for shifting one of said gears on one of said shafts into and out of engagement with another of said gears on the other of said shafts, a locking mechanism normally locking said shiftable gear against shifting movement, hydraulically operable actuating means for actuating said mechanism to release said shiftable gear, a motor, a reduction gear mechanism driven by said motor for producing a slow speed oscillating rotary motion, a normally disengaged hydraulically operable clutch for coupling said mechanism to one of said shafts and applying said oscillating rotary motion thereto while said gears are disengaged, an hydraulic pump driven by said motor, and operative hydraulic connections from the motor to said gear shifter, said locking mechanism and said clutch.

8. Gearing in accordance with claim 7, wherein the locking mechanism includes a latching member which is normally biased towards a latching position in which it prevents movement of the gear shifter, and a bolt which normally holds the latch in said latching position, said bolt being automatically withdrawn in response to operation of said motor.

9. Gearing in accordance with claim 8, wherein the latching member is common to a plurality of gear shifters in such a manner that for any of the gears to be movable the latching member must be in its unlatching position.

10. Gearing in accordance with claim 9, comprising an energizing circuit for said motor which includes holding means for maintaining said circuit and a switch operable in response to return of the latching member to its latching position to de-activate said holding means and thereby de-energize the motor.

11. Gearing in accordance with claim 1, wherein said reduction gear mechanism comprises a fixed internal ring gear concentric with the drive shaft of said motor, a pinion meshing with the gear and journalled eccentrically on said drive shaft for rotation at relatively low speed and eccentric motion about the axis of said shaft as said shaft rotates at relatively high speed, a crank disc concentric with said drive shaft, a lost motion device which transmits only the rotation of said pinion to said disc, and a crank arm having one end connected to said disc and the other end connected to the driving member of said clutch.

References Cited by the Examiner

UNITED STATES PATENTS 2,764,032   9/1956   Leber _____ 74—339

DAVID J. WILLIAMOWSKY, *Primary Examiner.*

H. S. LAYTON, *Assistant Examiner.*